(12) United States Patent
Longman et al.

(10) Patent No.: US 10,962,636 B2
(45) Date of Patent: Mar. 30, 2021

(54) RANGE AND DIRECTION OF ARRIVAL MIGRATION WITH DOPPLER AMBIGUITY ESTIMATION

(71) Applicant: GM GLOBAL TECHNOLOGY OPERATIONS LLC, Detroit, MI (US)

(72) Inventors: Oren Longman, Tel Aviv (IL); Shahar Villeval, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 239 days.

(21) Appl. No.: 16/101,870

(22) Filed: Aug. 13, 2018

(65) Prior Publication Data

US 2020/0049810 A1   Feb. 13, 2020

(51) Int. Cl.
*G01S 13/58* (2006.01)
*G01S 7/295* (2006.01)

(52) U.S. Cl.
CPC ............ *G01S 13/582* (2013.01); *G01S 7/295* (2013.01)

(58) Field of Classification Search
CPC .... G01S 13/582; G01S 13/583; G01S 13/584; G01S 13/588; G01S 13/64; G01S 13/72; G01S 13/53; G01S 13/528; G01S 13/931
USPC ....................................................... 342/107
See application file for complete search history.

(56) References Cited

U.S. PATENT DOCUMENTS

| 5,657,022 | A | * | 8/1997 | Van Etten | ........... | G01S 13/0209 |
| | | | | | | 342/104 |
| 5,818,383 | A | * | 10/1998 | Stockburger | .............. | G01S 3/46 |
| | | | | | | 342/109 |
| 7,639,171 | B2 | * | 12/2009 | Alland | ...................... | H01Q 1/28 |
| | | | | | | 342/25 R |
| 7,969,345 | B2 | * | 6/2011 | Abatzoglou | .......... | G01S 13/904 |
| | | | | | | 342/25 R |
| 8,519,882 | B2 | * | 8/2013 | Huizing | ................... | G01S 7/414 |
| | | | | | | 342/25 R |
| 2010/0259442 | A1 | * | 10/2010 | Abatzoglou | .......... | G01S 13/282 |
| | | | | | | 342/25 A |
| 2011/0122013 | A1 | * | 5/2011 | Takeya | .................... | G01S 13/44 |
| | | | | | | 342/109 |
| 2016/0084943 | A1 | * | 3/2016 | Arage | ..................... | G01S 13/42 |
| | | | | | | 342/102 |
| 2019/0041494 | A1 | * | 2/2019 | Roger | ..................... | G01S 7/352 |

OTHER PUBLICATIONS

Maneuvering Target Detection via Radon-Fractional Fourier Transform-Based Long-Time Coherent Integration, Xiaolong Chen, IEEE Transactions on Signal Processing, vol. 62, No. 4, Feb. 15, 2014 (Year: 2014).*

* cited by examiner

*Primary Examiner* — Erin F Heard
*Assistant Examiner* — Michael W Justice
(74) *Attorney, Agent, or Firm* — Cantor Colburn LLP

(57) ABSTRACT

A vehicle, radar system for a vehicle, and method of determining a radial velocity of an object via the radar system. The radar system includes a transmitter, receiver and processor. The transmitter transmits a source signal towards an object, and the receiver for receives a reflection of the source signal from the object. The processor obtains a Doppler measurement related to a radial velocity of the object, wherein the Doppler measurement includes a Doppler ambiguity, obtains a range walk rate for the radial velocity of the object, and resolves the Doppler ambiguity of the Doppler measurement using the range walk rate to obtain the radial velocity of the object.

14 Claims, 7 Drawing Sheets

RANGE AND DIRECTION OF ARRIVAL MIGRATION WITH DOPPLER AMBIGUITY ESTIMATION

INTRODUCTION

The subject disclosure relates to measuring range and direction of arrival parameters in radar systems and, in particular, to a method for reducing ambiguity in Doppler and estimating range and direction of arrival parameters under migration.

Radar systems used in vehicles are manufactured to have detection ranges as large as possible. One way to increase a detection range includes increasing a radar integration time. In addition, the resolutions in range and direction of arrival decrease as the frequency used in the radar systems increases. This increase in integration time and decrease in resolution causes the radar system to run up against a coherency limit, either with respect to range or with respect to direction of arrival parameters. A radar system that surpasses either the range coherency limit or the direction of arrival coherency limit will not have an increase in detection range as the integration time is increased. It is desirable to provide reduced Doppler ambiguity in radar systems.

SUMMARY

In one exemplary embodiment, a method of determining a radial velocity of an object via a radar system is disclosed. The method includes obtaining a Doppler measurement related to a radial velocity of the object, wherein the Doppler measurement includes a Doppler ambiguity, obtaining a range walk rate for the radial velocity of the object, resolving the Doppler ambiguity of the Doppler measurement using the range walk rate to obtain the radial velocity of the object.

In addition to one or more of the features described herein, obtaining the range walk rate further includes comprises locating maximal energy peaks in range cells in a range-Doppler-Beam-Range Rate-direction-of-arrival (DOA) Rate energy map. The method further includes determining a curve connecting the range cells to obtain the range walk rate. The method further includes performing a Radon transform on a radar signal to obtain a Radon parameter space. The method further includes performing at least one of determining a range walk rate from a peak in the Radon parameter space, determining a direction of arrival rate from a peak in the Radon parameter space; and reducing a power loss due to at least one of a range migration and a DOA migration. The method further includes performing the Radon transform as a Fast Fourier Transform on range and direction of arrival transform terms to reduce a computational expense in determining the Radon transform. The method further includes navigating the vehicle with respect to the object using the radial velocity determined from resolving the Doppler ambiguity.

In another exemplary embodiment, a radar system for a vehicle is disclosed. The radar system includes a transmitter for transmitting a source signal towards an object, a receiver for receiving a reflection of the source signal from the object, and a processor. The processor is configured to obtain a Doppler measurement related to a radial velocity of the object from the reflection, wherein the Doppler measurement includes a Doppler ambiguity, obtain a range walk rate for the radial velocity of the object, and resolve the Doppler ambiguity of the Doppler measurement using the range walk rate to reduce an ambiguity of the radial velocity of the object.

In addition to one or more of the features described herein, the processor is further configured to obtain the range walk rate by locating maximal energy peaks in range cells in a range-Doppler-Beam-Range Rate-direction-of-arrival (DOA) Rate energy map. The processor is further configured to determine a curve connecting the range cells to obtain the range walk rate. The processor is further configured to perform a Radon transform on a radar signal to obtain a Radon parameter space. The processor is further configured to perform at least one of determining a range walk rate from a peak in the Radon parameter space, determining a direction of arrival rate from a peak in the Radon parameter space, and reducing a power loss due to at least one of a range migration and a DOA migration. The processor is further configured to perform the Radon transform as a Fast Fourier Transform on range and direction of arrival transform terms to reduce a computational expense in determining the Radon transform. The processor is further configured to navigate the vehicle with respect to the object using the radial velocity determined from resolving the Doppler ambiguity.

In yet another exemplary embodiment, a vehicle is disclosed. The vehicle includes a transmitter for transmitting a source signal towards an object, a receiver for receiving a reflection of the source signal from the object, and a processor. The processor is configured to obtain a Doppler measurement related to a radial velocity of the object from the reflection, wherein the Doppler measurement includes a Doppler ambiguity, obtain a range walk rate for the radial velocity of the object, and resolve the Doppler ambiguity of the Doppler measurement using the range walk rate to reduce an ambiguity of the radial velocity of the object.

In addition to one or more of the features described herein, the processor is further configured to obtain the range walk rate by locating maximal energy peaks in range cells in a range-Doppler-Beam-Range Rate-direction-of-arrival (DOA) Rate energy map. The processor is further configured to determine a curve connecting the range cells to obtain the range walk rate. The processor is further configured to perform a Radon transform on a radar signal to obtain a Radon parameter space. The processor is further configured to perform at least one of determining a range walk rate from a peak in the Radon parameter space, determining a direction of arrival rate from a peak in the Radon parameter space, and reducing a power loss due to at least one of a range migration and a DOA migration. The processor is further configured to perform the Radon transform as a Fast Fourier Transform on range and direction of arrival transform terms to reduce a computational expense in determining the Radon transform.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
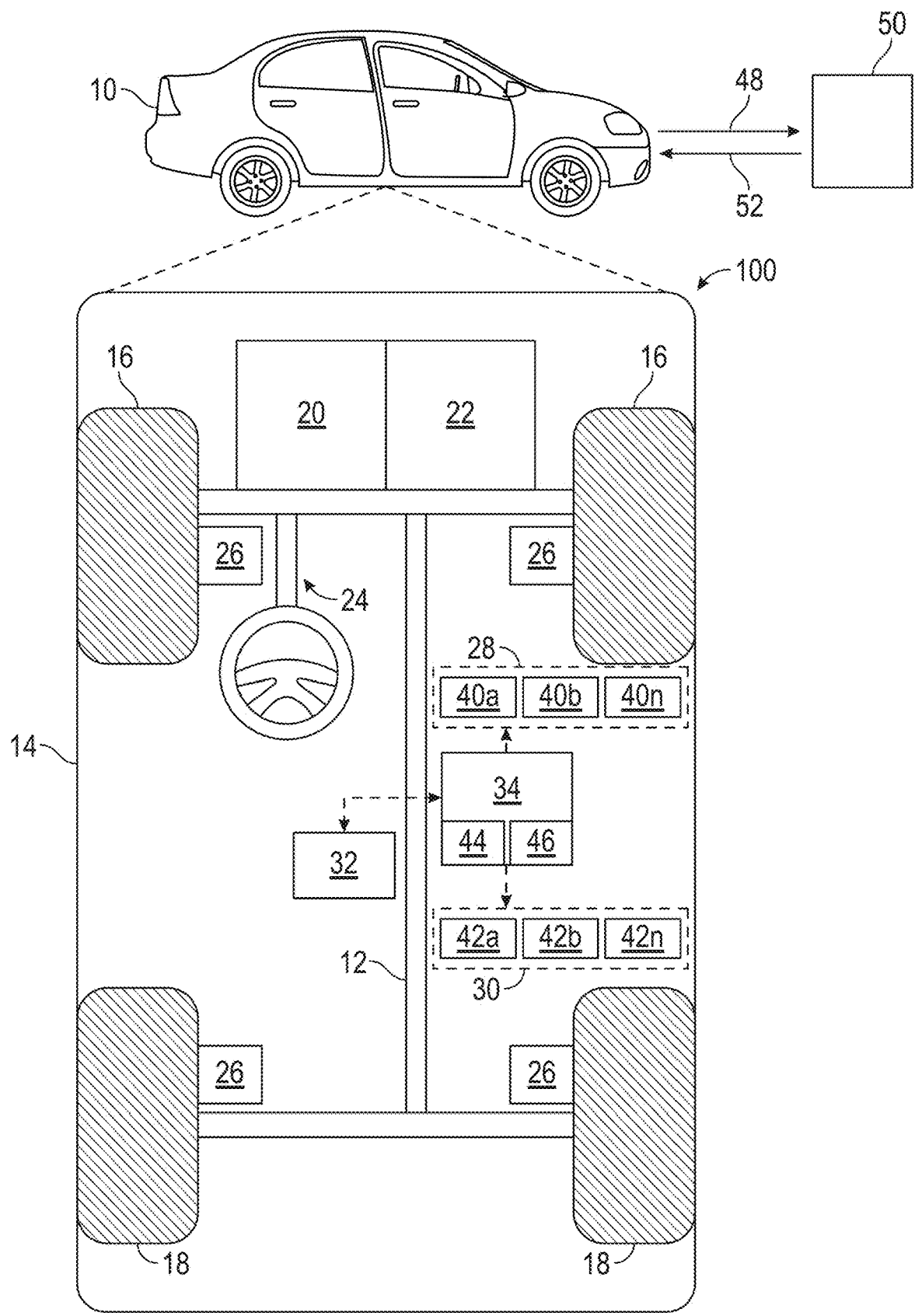
FIG. 1 shows a vehicle with an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32 and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a radar system including an array of radar sensors, the radar sensors of the radar array being located at various locations along the vehicle 10. In operation, a radar sensor sends out an electromagnetic source pulse 48 that is reflected back at the vehicle 10 by one or more objects 50 in the field of view of the sensor. The source pulse 48 is a linear frequency modulated (LFM) pulse or "chirp" pulse and obtains range, Doppler and direction of arrival measurements of the one or more objects 50. These measurements can migrate in range and/or in direction of arrival when the radar system runs up against coherency limits, thereby limiting signal power. The radar system disclosed herein provides a process for breaking or surpassing these coherency limits and for resolving Doppler ambiguity. These methods are discussed below.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/or their locations within the environment of the vehicle. In various embodiments the controller 34 operates a plurality of radars at various locations on the vehicle 10 to determine a parameter (i.e., range, elevation and azimuth, Doppler frequency) of the object 50 using a plurality of chirp signals. Upon determining various parameters of the object, the controller 34 can operate the one or more actuator devices 42a-n, the propulsion system 20, transmission system 22, steering system 24 and/or brake 26 in order to navigate the vehicle 10 with respect to the object 50.

In the radar system, the length of the chirp signal is limited to frame duration T. For a given frame duration, an object having a large enough radial velocity can appear to move from one location to another during the frame duration. This causes range migration as a peak representing the target will be spread across in multiple range bins. A range coherency limit for radar systems is expressed in Eq. (1):

$$\frac{T \cdot V_{radial}}{\Delta R} < 1 \qquad \text{Eq. (1)}$$

where $V_{radial}$ is the radial velocity and $\Delta R$ is the radar's range resolution and T is the frame duration. Similarly, if the target is moving across the field of view of the radar system with a sufficient angular speed, a peak representing the target will be spread across multiple angular bins. Similarly, an equation stating a direction-of-arrival (DOA) coherency limit as expressed in Eq. (2):

$$\frac{\sin^{-1}\left(\frac{T \cdot V_{radial}}{\Delta R}\right)}{\Delta DOA} < 1 \qquad \text{Eq. (2)}$$

wherein $\Delta DOA$ is the radar's angular resolution, equal to beam width. A frame duration that does not meet the criteria of Eq. (1) or Eq. (2) loses its effectiveness due to the range and/or DOA of the target migrating between cells during the frame.

Figure 2:
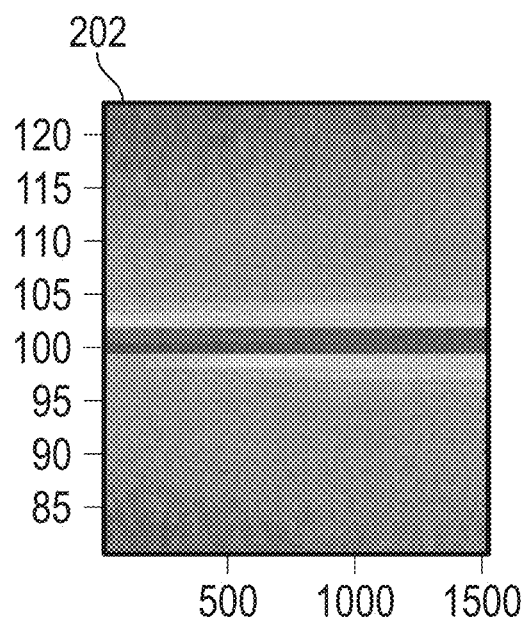
FIG. 2 illustrates the effects of object motion in migration between range cells.
Figure 2:
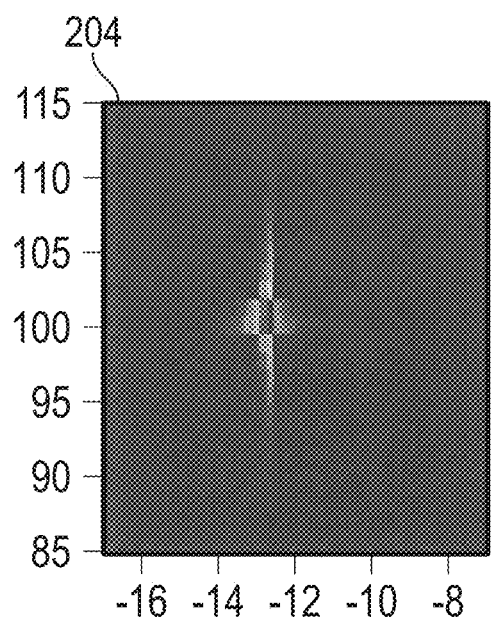
Figure 2:
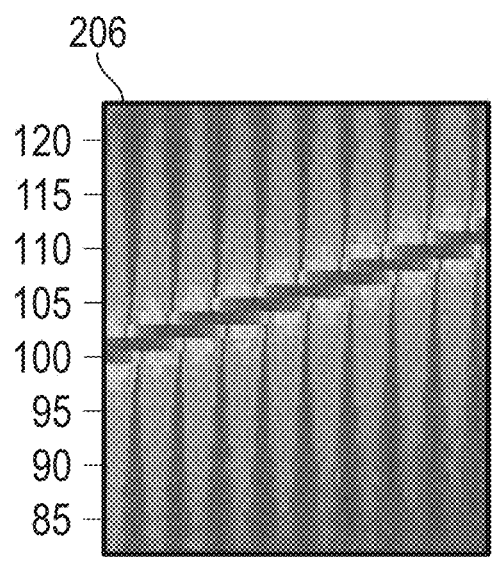
Figure 2:
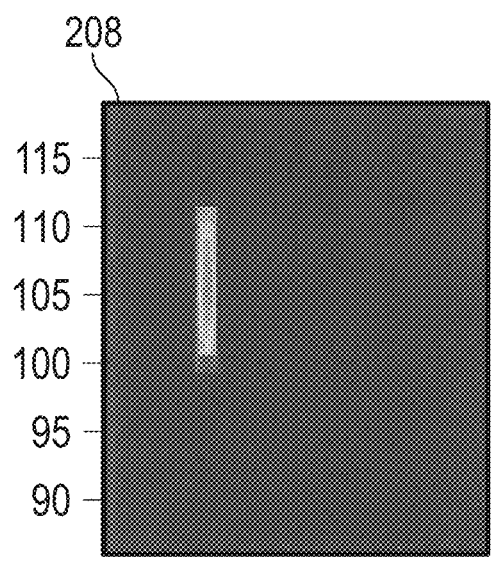

FIG. 2 illustrates the effects of object motion in migration between range cells. Range-chirp map 202 shows a range for an object that is either stationary or having a radial velocity constrained by the range coherency limit of Eq. (1). The chirp index is the chirp numbering. Each chirp has a time duration, and the chirp index is related to time. The range chirp map 202 shows an object that remains at a range of about 100 meters for the entire frame duration. Range-Doppler map 204 is related to the range-chirp map 202 and displays well-defined (non-ambiguous) range and the Doppler parameter values.

In comparison, range-chirp map 206 shows a range for an object having a radial velocity that violates the range coherency limit of Eq. (1). The range chirp map 206 shows that the object changes its range during the frame duration from about 100 meters at the beginning of the frame to about 110 meters by the end of the frame. Range-Doppler map 208, related to range-chirp map 206, displays a target whose range is migrating, since the range value is spread across several range bins.

Figure 3:
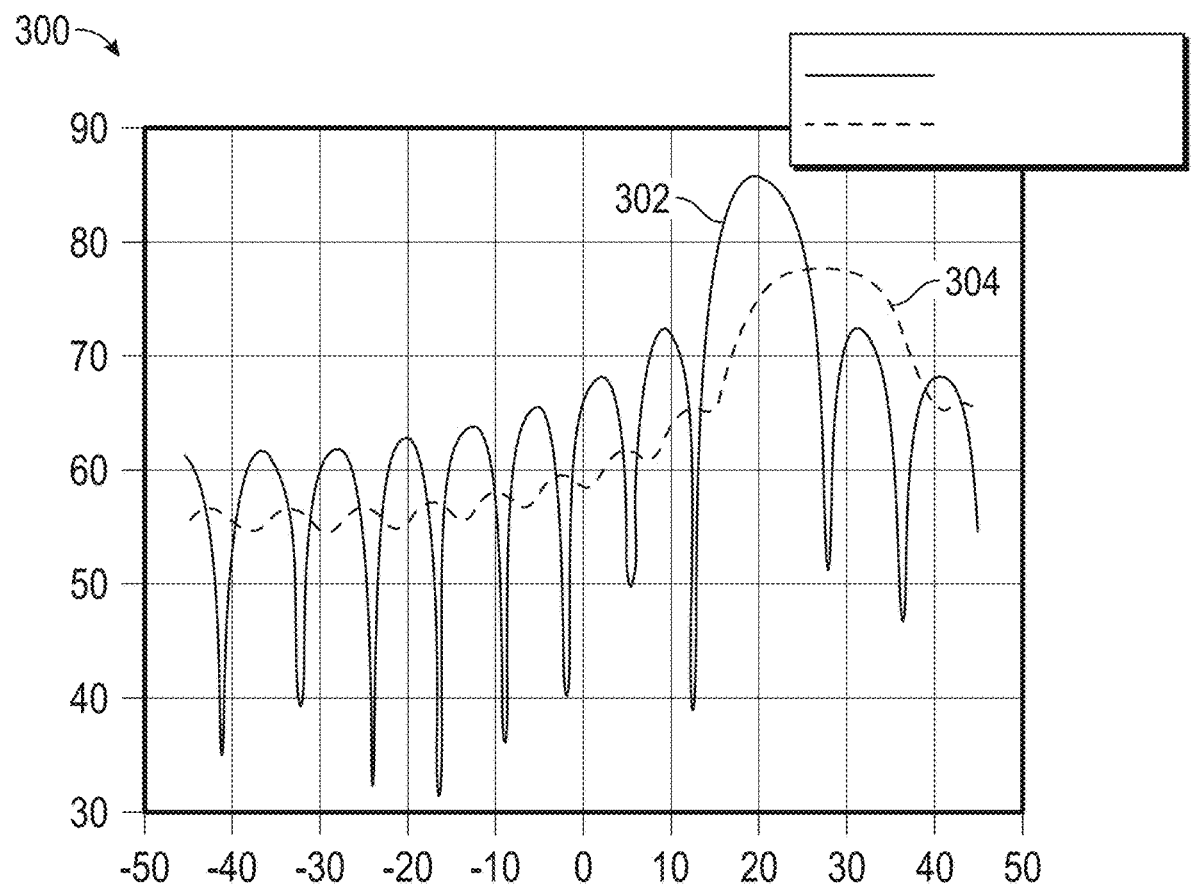
FIG. 3 illustrates the effect of transverse motion on direction of arrival measurements.

FIG. 3 illustrates the effect of transverse motion on direction of arrival measurements 300. Signal power is plotted against azimuth. For a static or slowly moving target, the power spectrum 302 indicate a peak at 20 degrees. For a moving target, the power spectrum 304 has a broad peak that is spread over a range of angles, thereby reducing the signal power and spreading the DOA parameter.

Another limitation occurs for the maximal Doppler frequency of the radar system. For a given radar pulse repetition frequency (PRF), a Doppler frequency that is greater than PRF/2 will be aliased and thereby incorrectly estimated. This phenomenon is called Doppler ambiguity.

Figure 4:
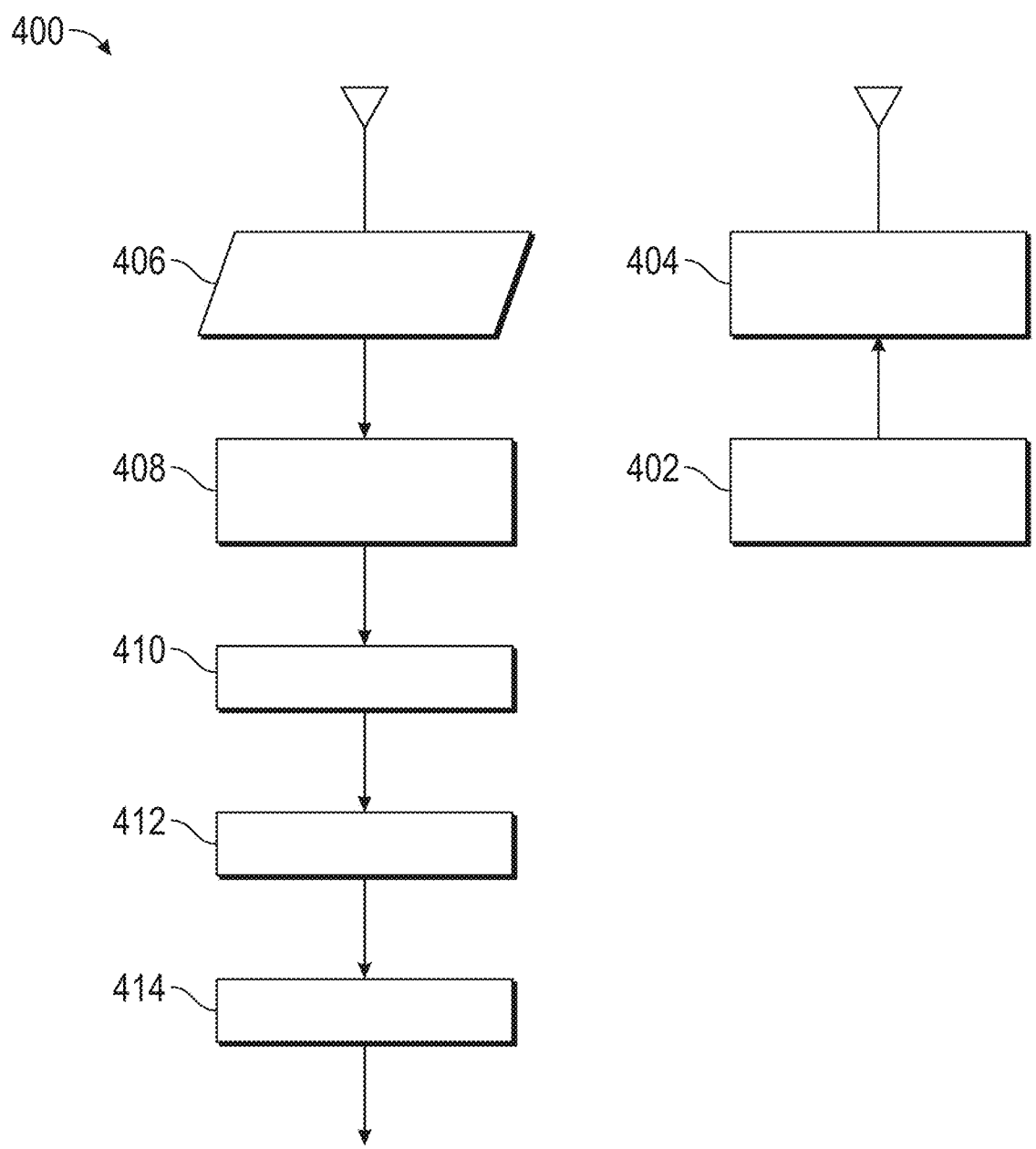
FIG. 4 shows a diagram of a radar system schematically illustrating a process involved in mitigating the target migration.

FIG. 4 shows a diagram of a radar system 400 schematically illustrating a process involved in mitigating the target migration. A waveform generator 402 generates a waveform and provides the waveform to a transmitter 404. The transmitter 404 includes circuitry for generating an electromagnetic source signal from the waveform and provides the source signal to transmitter antenna ($T_x$) which propagates the source signal into the environment. A reflection of the source signal from an object is received at receiver antenna ($R_x$) and produces an electrical signal at receiver 406. The receiver 406 converts the signal to a digital signal and samples the digital signal. The sampled signal is then provided to a digital processor 408 that performs a radon transform on the sampled signal. The radon transform generates a range-Doppler-Beam-Range Rate-DOA Rate energy map. A peak detector 410 locates peaks in the range-Doppler-Beam-Range Rate-DOA Rate energy map. Detector 412 extracts detection from the Range-Doppler-Beam energy map. Doppler solver 414 then resolves the Doppler ambiguity using the range walk rate.

A radon transform is a generalized FFT transform in which the integration path is dynamic. A radon transform is shown below in Eqs. (3)-(5):

$$S[k, l, \theta, p, q] = \qquad \text{Eq. (3)}$$

$$\sum_{ch=1}^{CH} \sum_{m=1}^{M} \sum_{n=1}^{N} s[n, m] \exp\left(-2\pi j k \frac{n}{N}\right) \exp\left(-2\pi j l \frac{m}{M}\right) \exp$$

$$\left(2\pi j \sin\theta ch \frac{d}{\lambda}\right) \exp(2\pi j R(n, m, p)) \exp(2\pi j D(m, ch, q))$$

where the term R(n, m, p) in Eq. (3) is given by:

$$R(n, m, p) = f \cdot t = \left(m \cdot PRI \cdot \frac{2 \cdot Slope}{c} p\right)(n \cdot f_s) \qquad \text{Eq. (4)}$$

and the term D(m, ch, q) is given by:

$$D(m, ch, q) = m \cdot PRI \cdot \sin(q) \cdot ch \frac{d}{\lambda}$$ Eq. (5)

where n is a sample index within a chirp, m is a chirp index within a frame and ch is an index within the sensor array, k is a range bin index, l is a Doppler bin index, θ is a direction of arrival bin, p is a range walk slope, q is a direction of arrival walk slope, $f_s$ is sample frequency, d is antenna element spacing diameter, λ is a signal wavelength and PRI is a pulse repetition interval.

Figure 5:
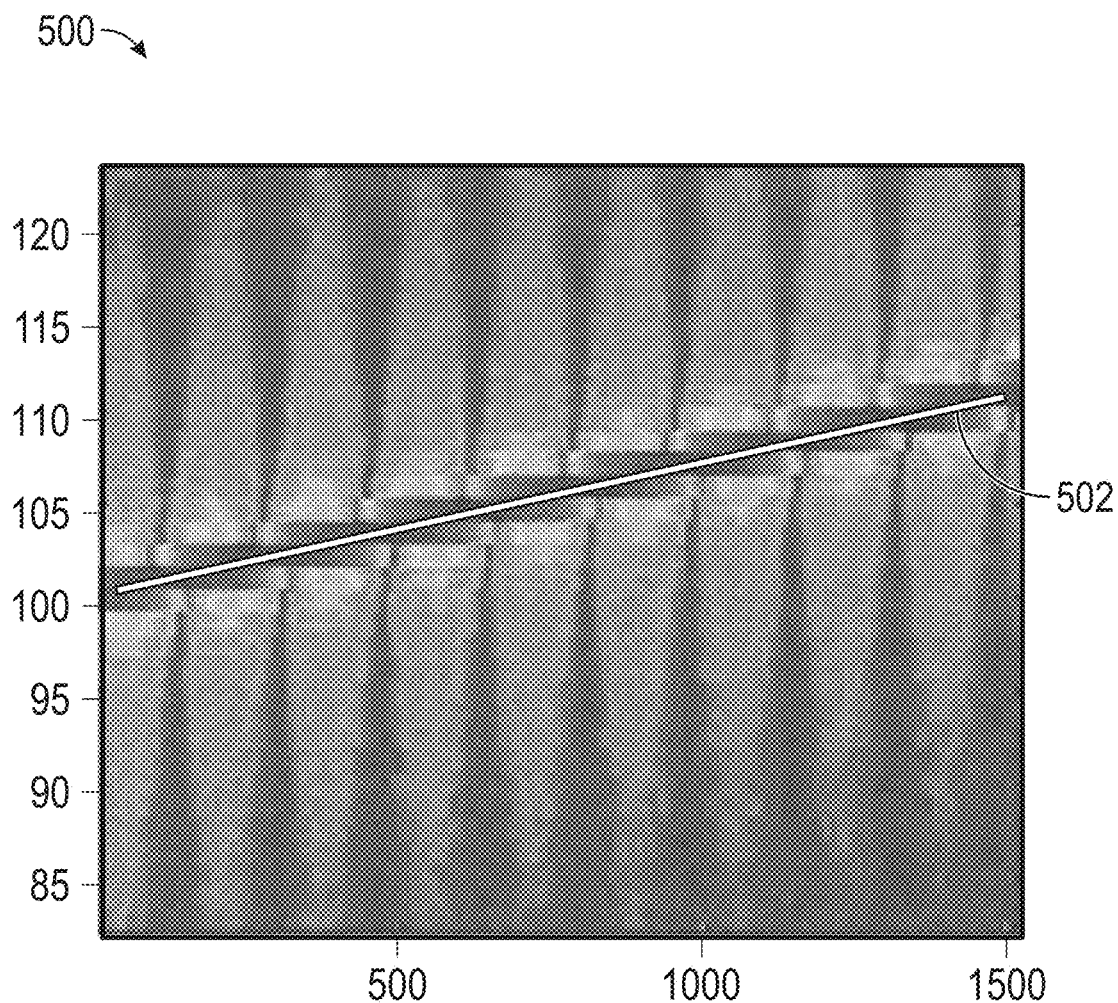
FIG. 5 shows a Range-Doppler energy map that is obtained using a Fast Fourier Transform.

FIG. 5 shows a Range-Doppler energy map 500 that is obtained using FFT. This figure shows an integration line which is obtained using the radon transform of Eqs. (3)-(5). The energy map 500 shows a different range values at different chirps. The peak detector 410, FIG. 4 locates the peak energies in the range-Doppler-Beam-Range Rate-DOA Rate energy map, where the peak energy is according to the drawn integration line 502. The detector 412, FIG. 4 detects these cells to determine the range walk rate. The Doppler solver 414, then determines an unambiguous Doppler value using the range walk rate, as shown in Eq. (8). The Doppler Solver receives two representations of radial velocity: The Doppler measurement and the range walk rate, illustrated in FIG. 5 as the integration line 502 slope. The Doppler measurement is accurate but ambiguous. The range walk rate is inaccurate but unambiguous. The range walk rate is therefore used to solve the Doppler ambiguity, as shown in Eq. (8):

$$Doppler_{unambiguous} =$$ Eq. (8)
$$\underset{k}{\operatorname{argmin}} \left| Doppler_{ambiguous} \cdot \frac{1}{nChirps \cdot PRI} + k \cdot PRF - RangeWalkRate\frac{2}{\lambda} \right|$$

where the index k determines the Doppler hypothesis, PRI is the pulse repetition interval, PRF is the pulse repetition frequency, nChirps is the number of chirps in a frame and λ is the signal wavelength.

Figure 6:
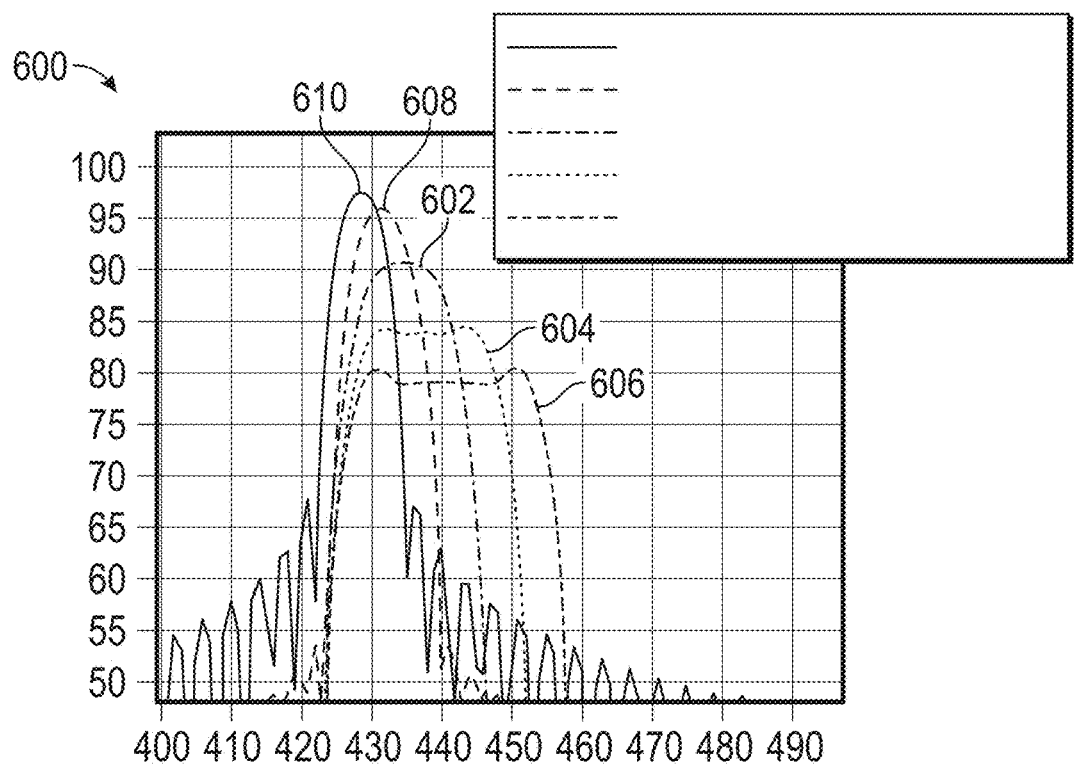
FIG. 6 shows the effects of Radon Transform for different range walk rates parameter in reducing power loss.

FIG. 6 shows the effects of Radon Transform for different range walk rates parameter in reducing power loss 600. FIG. 6 shows various power spectra of range parameter a first power spectrum 602 depicts values for range without applying a range walk correction. The peak of the first power spectrum is flat and with lowered energy, leading to a low accuracy in range and reduced detection range. Applying a range walk rate of +5 bins produces spectrum 604 and applying a range walk rate of +10 bins produces spectrum 606. Spectra 604 and 606 have even broader peaks than spectrum 602 and thus lower the accuracy and detection range. Applying a range walk rate of −5 bins produces spectrum 608 and applying a range walk rate of −10 bins produces spectrum 610. Spectrum 608 has a more defined and finer peak than spectrum 602. Spectrum 610 has an even more defined peak. Therefore, applying the range walk rate of −10 bins is able to reduce loss of the detection range and improve accuracy in the range parameter.

Figure 7:
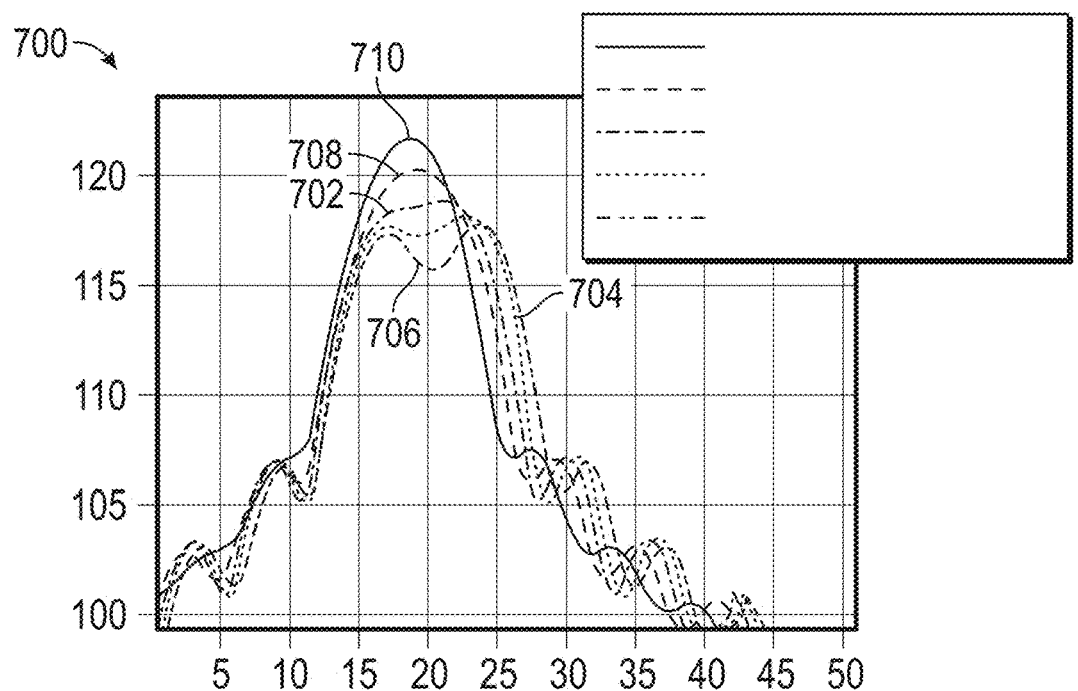
FIG. 7 shows various power spectra of an azimuth parameter.

FIG. 7 shows various power spectra of an azimuth parameter 700. A first power spectrum 702 depicts values for azimuth without applying a DOA walk correction. The peak of the first power spectrum is uneven and broad, leading to a low accuracy in azimuth and reduced detection range. Applying a range walk rate of +5 degrees produces spectrum 704 and applying a range walk rate of +10 degrees produces spectrum 706. Spectra 704 and 706 have even broader peaks than spectrum 702 with the peaks destabilizing into two separate peaks with a valley between them, thus creating even less accuracy in the azimuth value and reducing the detection range. Applying a range walk rate of −5 degrees produces spectrum 708 and applying a range walk rate of −10 degrees produces spectrum 710. Spectrum 708 has a more defined and finer peak than spectrum 702. Spectrum 710 has an even more defined peak. Therefore, applying the range walk rate of −10 degrees is able to reduce the loss of detection range and improve the accuracy in the azimuth parameter.

Implementation of the radon transform of Eq. (3) can be made efficient by rearranging the summation terms as shown in Eq. (6):

$$S[k, l, \theta, p, q] =$$ Eq. (6)
$$s[n, m]\exp(2\pi jR(n, m, p)) \sum_{ch=1}^{CH} \sum_{m=1}^{M} \sum_{n=1}^{N} \exp(2\pi jD(m, ch, q))$$
$$\exp\left(-2\pi jk\frac{n}{N}\right)\exp\left(-2\pi jl\frac{m}{M}\right)\exp\left(2\pi j\sin\theta ch\frac{d}{\lambda}\right)$$

The summation of Eq. (6) can then be calculated efficiently and with less computational power using a Fast Fourier Transform as expressed in Eq. (7):

$$S[k, l, \theta, p, q] = FFT3 \left\{ \begin{array}{l} s[n, m]\exp(2\pi jR(n, m, p)) \\ \exp(2\pi jD(m, ch, q)) \end{array} \right\}$$ Eq. (7)

Applying Eq. (7) results in a Radon parameter space as shown in FIG. 8.

Figure 8:
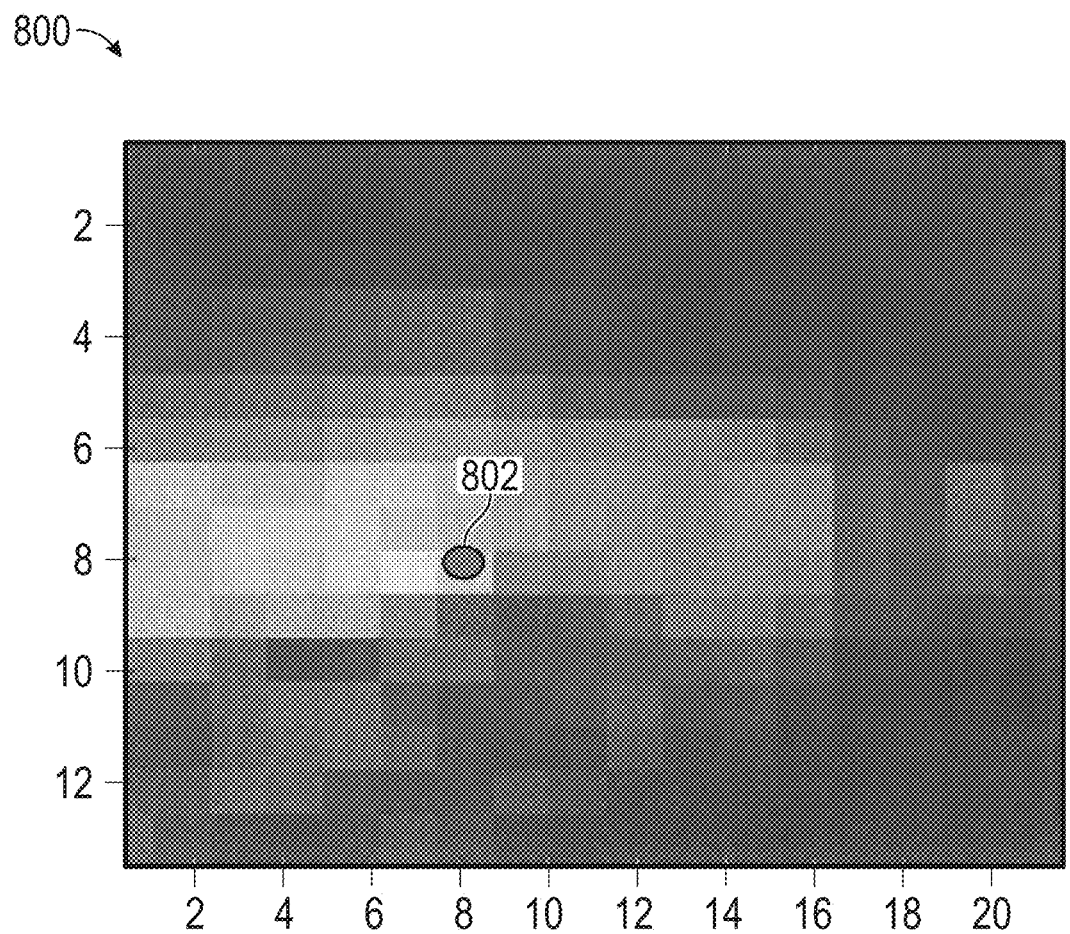
FIG. 8 shows a Radon transform parameter space obtained by performing the Fast Fourier Transform of Eq. (7).

FIG. 8 shows a Radon transform parameter space 800 obtained by performing the FFT of Eq. (7). For each k-l-θ point, there is a p-q parameter space of the target. Peak detection is performed in order to extract the detection 802 with the correct range walk rate and DOA walk rate. A threshold test can be performed in order to eliminate false detections and reduce computational load.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of determining a radial velocity of an object via a radar system, comprising:
   transmitting a chirp signal at the object, the object having a radial velocity with respect to the radar system;
   receiving a reflection of the chirp signal from the object;
   obtaining an ambiguous Doppler measurement related to the radial velocity of the object;
   obtaining a range walk rate indicative of a range migration of the object during the chirp signal by determining a slope of a line of peak energies in a Range-chirp map for the reflection of the chirp signal;

determining an unambiguous Doppler measurement using the range walk rate and the ambiguous Doppler measurement; and determining the radial velocity from the unambiguous Doppler measurement, wherein obtaining the range walk rate further comprises locating maximal energy peaks in range cells in a range-Doppler-Beam-Range Rate-direction-of-arrival (DOA) Rate energy map and determining a curve connecting the range cells.

2. The method of claim 1, further comprising performing a Radon transform on a radar signal to obtain a Radon parameter space.

3. The method of claim 2, further comprising performing at least one of: (i) determining the range walk rate from a peak in the Radon parameter space; (ii) determining a direction of arrival rate from a peak in the Radon parameter space; and (iii) reducing a power loss due to at least one of a range migration and a DOA migration.

4. The method of claim 2, further comprising performing the Radon transform as a Fast Fourier Transform on range and direction of arrival transform terms to reduce a computational expense in determining the Radon transform.

5. The method of claim 1, further comprising navigating a vehicle with respect to the object using the radial velocity determined from resolving the Doppler ambiguity.

6. A radar system for a vehicle, comprising:
a transmitter for transmitting a chirp signal towards an object;
a receiver for receiving a reflection of the chirp signal from the object; and
a processor configured to:
obtain an ambiguous Doppler measurement related to a radial velocity of the object from the reflection;
obtain a range walk rate indicative of a range migration of the object during the chirp signal by determining a slope of a line of peak energies in a Range-chirp map for the reflection of the chirp signal, including locating maximal energy peaks in range cells in a range-Doppler-Beam-Range Rate-direction-of-arrival (DOA) Rate energy map and determining a curve connecting the range cell;
resolve the Doppler ambiguity of the Doppler measurement using the range walk rate to reduce an ambiguity of the radial velocity of the object, determine an unambiguous Doppler measurement using the range walk rate and the ambiguous Doppler measurement; and
determine the radial velocity from the unambiguous Doppler measurement.

7. The radar system of claim 6, the processor is further configured to perform a Radon transform on a radar signal to obtain a Radon parameter space.

8. The radar system of claim 7, the processor is further configured to perform at least one of: (i) determining a range walk rate from a peak in the Radon parameter space; (ii) determining a direction of arrival rate from a peak in the Radon parameter space; and (iii) reducing a power loss due to at least one of a range migration and a DOA migration.

9. The radar system of claim 7, wherein the processor is further configured to perform the Radon transform as a Fast Fourier Transform on range and direction of arrival transform terms to reduce a computational expense in determining the Radon transform.

10. The radar system of claim 6, wherein the processor is further configured to navigate the vehicle with respect to the object using the radial velocity determined from resolving the Doppler ambiguity.

11. A vehicle, comprising:
a transmitter for transmitting a chirp signal towards an object;
a receiver for receiving a reflection of the chirp signal from the object; and
a processor configured to:
obtain an ambiguous Doppler measurement related to a radial velocity of the object from the reflection;
obtain a range walk rate indicative of a range migration of the object during the chirp signal by determining a slope of a line of peak energies in a Range-chirp map for the reflection of the chirp signal, including locating maximal energy peaks in range cells in a range-Doppler-Beam-Range Rate-direction-of-arrival (DOA) Rate energy map and determining a curve connecting the range cell;
resolve the Doppler ambiguity of the Doppler measurement using the range walk rate to reduce an ambiguity of the radial velocity of the object, determine an unambiguous Doppler measurement using the range walk rate and the ambiguous Doppler measurement; and
determine the radial velocity from the unambiguous Doppler measurement.

12. The vehicle of claim 11, wherein the processor is further configured to perform a Radon transform on a radar signal to obtain a Radon parameter space.

13. The vehicle of claim 12, wherein the processor is further configured to perform at least one of: (i) determining a range walk rate from a peak in the Radon parameter space; (ii) determining a direction of arrival rate from a peak in the Radon parameter space; and (iii) reducing a power loss due to at least one of a range migration and a DOA migration.

14. The vehicle of claim 11, wherein the processor is further configured to perform a Radon transform as a Fast Fourier Transform on range and direction of arrival transform terms to reduce a computational expense in determining the Radon transform.

* * * * *